US006845454B2

(12) United States Patent
Kim

(10) Patent No.: US 6,845,454 B2
(45) Date of Patent: Jan. 18, 2005

(54) SYSTEM AND METHOD FOR SELECTING BETWEEN A HIGH AND LOW SPEED CLOCK IN RESPONSE TO A DECODED POWER INSTRUCTION

(75) Inventor: Dong-Yun Kim, Yongin-shi (KR)

(73) Assignee: Samsung Electronics Co., Ltd. (KR)

(*) Notice: Subject to any disclaimer, the term of this patent is extended or adjusted under 35 U.S.C. 154(b) by 671 days.

(21) Appl. No.: 09/818,888

(22) Filed: Mar. 27, 2001

(65) Prior Publication Data
US 2002/0026596 A1 Feb. 28, 2002

(30) Foreign Application Priority Data
Aug. 31, 2000 (KR) ......................................... 2000-51124

(51) Int. Cl.[7] .............................. G06F 1/26; G06F 1/32
(52) U.S. Cl. ....................... 713/300; 713/310; 713/322; 713/324; 713/330; 713/501
(58) Field of Search ............................... 713/501, 330, 713/322, 310; 455/574

(56) References Cited

U.S. PATENT DOCUMENTS

| | | | | |
|---|---|---|---|---|
| 4,615,005 A | * | 9/1986 | Maejima et al. | 713/601 |
| 5,426,755 A | * | 6/1995 | Yokouchi et al. | 711/101 |
| 5,454,114 A | * | 9/1995 | Yach et al. | 713/330 |
| 5,907,699 A | * | 5/1999 | Nakajima | 713/501 |
| 6,044,282 A | * | 3/2000 | Hlasny | 455/574 |

FOREIGN PATENT DOCUMENTS

| | | | | |
|---|---|---|---|---|
| JP | 06332583 A | * | 12/1994 | G06F/1/26 |
| JP | 10-301661 | | 11/1998 | |

OTHER PUBLICATIONS

Victor Nelson et al., Digital Logic Circuit Analysis and Design, 1995, Prentice–Hall Inc., pp. 449–460.*

* cited by examiner

Primary Examiner—Thomas Lee
Assistant Examiner—Mark Connolly
(74) Attorney, Agent, or Firm—F. Chau & Associates, LLC

(57) ABSTRACT

A processor clock generation circuit and related method for a low power consumption modem chip design includes a first clock generator for generating a first clock signal in response to enable and disable signals; a second clock generator for generating a second clock signal that is lower in frequency than the first clock signal; a decoder for decoding an externally inputted instruction to check whether the inputted instruction is a power-down instruction or a power-up instruction, and generating control signals; a clock selection unit for, if the instruction is the power-down instruction, outputting the second clock signal as a processor clock signal and outputting a clock change end signal in response to a control signal outputted from the decoder and, if the instruction is the power-up instruction, outputting the first clock signal as the processor clock signal in response to the outputted control signal from the decoder and a first clock wake-up end signal; and a first clock controller for, if the instruction is the power-down instruction, outputting the disable signal for disabling clock generation of the first clock generator in response to the control signal outputted from the decoder and the clock change end signal outputted from the clock selection unit and, if the instruction is the power up instruction, outputting the enable signal for enabling the clock generation of the first clock generator in response to the control signal outputted from the decoder, and outputting the first wake-up end signal after a predetermined time.

8 Claims, 5 Drawing Sheets

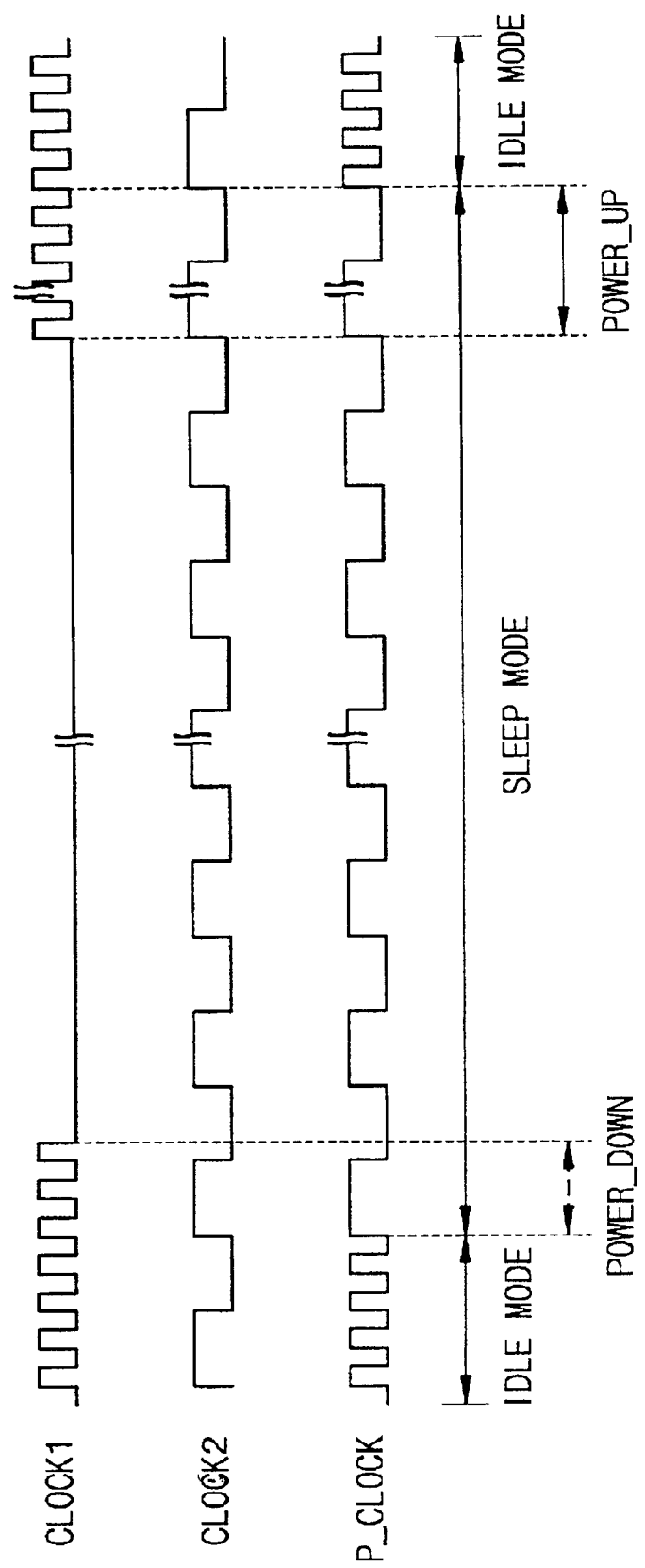

SYSTEM AND METHOD FOR SELECTING BETWEEN A HIGH AND LOW SPEED CLOCK IN RESPONSE TO A DECODED POWER INSTRUCTION

This application relies for priority upon Korean Patent Application No. 2000-51124, filed on Aug. 31, 2000, the contents of which are herein incorporated by reference in their entirety.

FIELD OF THE INVENTION

The present invention relates to a modem chip built in a communication terminal and, more particularly, to circuit and method of generating a process clock for a low power consumption code division multiple access (CDMA) modem chip design.

BACKGROUND OF THE INVENTION

Mobile communication technology recently trends toward rapid data service and miniaturization. Accordingly, there have been many efforts to achieve a multi system on-chip technology and develop a lower power consumption chip.

Mobile communication stations often have sleep modes to conserve energy and it is found that, in general, a typical mobile station will be in sleep mode about 92% out of total stand-by time. One conventional method for reducing power consumption during sleep mode in a modem chip of a mobile station is to control a speed of an operation clock signal of a processor built in a modem, according to an operation mode of the processor. In other words, during an idle mode when a control signal is transmitted and received between a mobile station and a base station, a main clock signal applied to a modem chip is used as a clock signal of a processor. Meanwhile, during a sleep mode when data and control signal do not need to be transmitted and received therebetween, the main clock is divided to be used as a process clock.

One example of such a conventional method is shown in FIG. 1. A main clock signal M_CLOCK of comparatively high frequency is used as a processor clock signal P_CLOCK during an idle mode. On the other hand, the main clock signal M_CLOCK is divided at a predetermined ratio during a sleep mode to form a signal of lower frequency that is then supplied to a process clock signal P_CLOCK.

By the above manner, power consumed in a processor during the sleep mode is saved insofar as the main clock signal is divided to the processor clock signal. Nevertheless, the main clock signal M_CLOCK of a high frequency remains and a special logic circuit for dividing the main clock signal is needful. Therefore, it is necessary to maintain power consumed in an input/output (I/O) pad and a divide logic circuit of a processor that receives the main clock signal M_CLOCK. For example, if the frequency of the main clock signal M_CLOCK is 30 MHz, the current consumed in the I/O pad is typically 3–4 mA. As a result, the conventional method has a limitation to reduce power consumption of a CDMA modem chip. A better way of reducing sleep mode power consumption is needed.

SUMMARY OF THE INVENTION

Disclosed is a processor clock generation circuit and related method for a low power consumption modem chip design, comprising a first clock generator for generating a first clock signal in response to enable and disable signals; a second clock generator for generating a second clock signal that is lower, in frequency, than the first clock signal; a decoder for decoding an externally inputted instruction to check whether the inputted instruction is a power-down instruction or a power-up instruction, and generating control signals; a clock selection unit for, if the instruction is the power-down instruction, outputting the second clock signal as a processor clock signal and outputting a clock change end signal in response to a control signal outputted from the decoder and, if the instruction is the power-up instruction, outputting the first clock signal as the processor clock signal in response to the outputted control signal from the decoder and a first clock wake-up end signal; and a first clock controller for, if the instruction is the power-down instruction, outputting the disable signal for disabling clock generation of the first clock generator in response to the control signal outputted from the decoder and the clock change end signal outputted from the clock selection unit and, if the instruction is the power-down instruction, outputting the enable signal for enabling the clock generation of the first clock generator in response to the control signal outputted from the decoder, and outputting the first wake-up end signal after a predetermined time.

BRIEF DESCRIPTION OF THE DRAWINGS

FIG. 4 is a timing view showing first and second clock signals, and a processor clock signal that are generated in a clock generation circuit shown in FIG. 2.

DESCRIPTION OF THE PREFERRED EMBODIMENT

A new and improved clock generation circuit includes a first clock generator for generating a first clock signal in response to enable and disable signals, a second clock generator for generating a second clock signal that is lower than the first clock signal in frequency, a decoder for decoding an externally inputted instruction to check whether it is a power-up instruction or a power-down instruction and generating control signals, a clock selection unit for outputting one of the first and second clock signals as a clock signal, and a first control controller for enabling and disabling generation of the first clock signal. When the power-down instruction for changing an operation mode of a process from an idle mode to a sleep mode is inputted, the clock signal generation circuit changes a processor clock signal from the first clock signal to the second clock signal and interrupts generation of the first clock signal. On the other hand, when the power-up instruction for changing the operation mode of the process from the sleep mode to the idle mode is inputted, the clock signal generation circuit controls generation of the first clock signal to be resumed and changes the processor clock signal from the second clock signal to the first clock signal. According to the clock generation circuit, power consumption can be minimized when an operation mode of a processor built in a CDMA chip is laid in a sleep mode.

Figure 1:
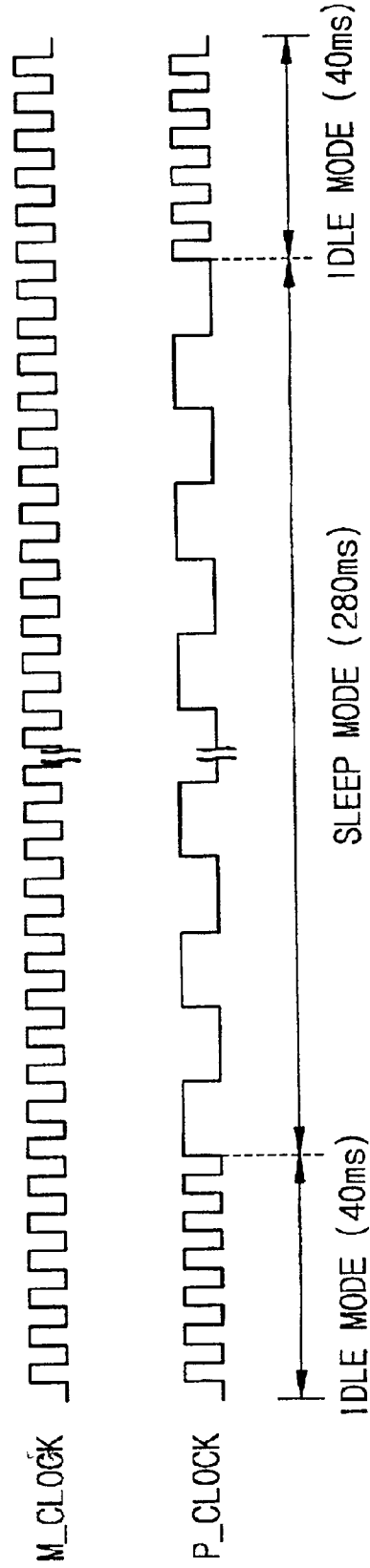
FIG. 1 is a timing view showing a main clock signal and a processor clock signal in accordance with a prior art.
Figure 2:
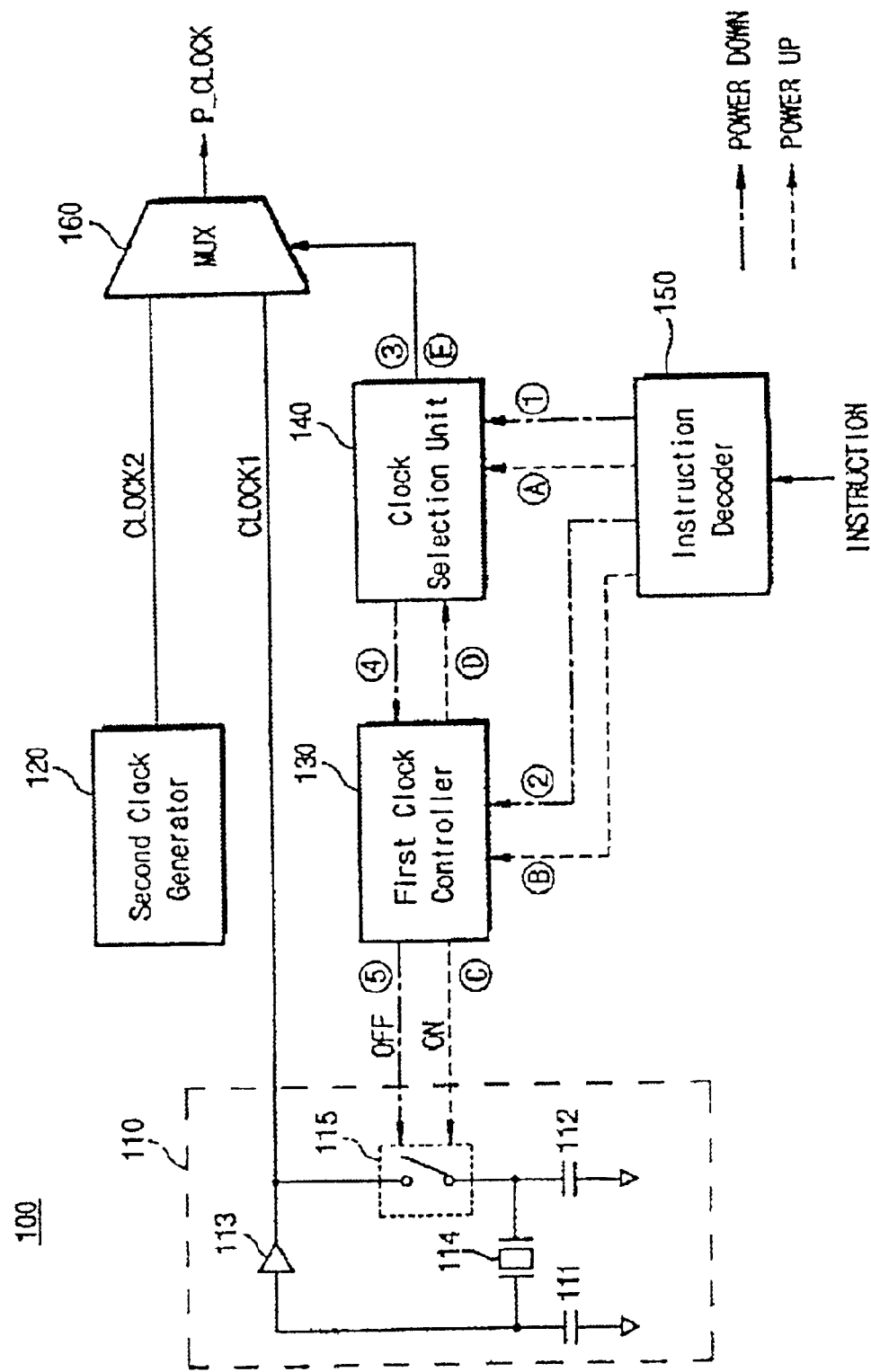
FIG. 2 is a block diagram showing a clock generation circuit showing a clock generation circuit in accordance with the present invention.

FIG. 2 schematically shows a clock generation circuit according to the present invention. A clock generation circuit 100 built in a modem chip includes a first clock generator 110, a second clock generator 120, a first clock controller 130, a clock selection unit 140, an instruction decoder 150, and a multiplexer 160. The first clock controller 130, the clock selection unit 140, the instruction decoder 150, and the multiplexer 160 integrated on a signal semiconductor chip.

The first clock generator 110 may include capacitors 111 and 112 that are respectively coupled to a crystal oscillator 112. Between both terminals of the crystal oscillator 112 and a ground voltage, a buffer 113, and a switch 115 coupled between an output terminal of the buffer 113 and one terminal of the crystal oscillator 114. The switch 115 is on/off controlled by switching on/off signals ON/OFF that are inputted from the first clock controller 130. In other words, when the switch 115 is switched on in response to the switching ON signal, a first clock signal CLOCK1 is generated. Meanwhile, when the switch 114 is switched off in response to the switching off signal OFF, generation of the first clock signal CLOCK1 is interrupted.

The second clock generator 120 generates a second clock signal CLOCK2 that is lower in frequency than the first clock signal CLOCK1 generated by the first clock generator 110.

The instruction decoder 150 decodes an externally inputted instruction to check whether it is a power-down instruction or a power-up instruction, and generates control signals corresponding thereto. In this case, the power-down instruction is to change an operation mode of the processor from an idle mode to a sleep mode, while the power-up instruction is to change the operation mode from the sleep mode back to the idle mode. As well known in the art, the power-up/down instructions may be generated by interrupts and the like.

The clock selection unit 140 outputs a selection signal for outputting one of the first and second clock signals CLOCK1 and CLOCK2 as a processor clock signal P_CLOCK, in response to a control signal that is outputted from the instruction decoder 150. Specifically, if the an instruction decoded in the instruction decoder 150 is a power-down instruction, the clock selection unit 140 outputs a selection signal 3 for selecting the second clock signal CLOCK2 in response to a control signal 1 that is inputted from the instruction decoder 150. Then, the clock selection unit 140 outputs a clock change end signal 4 to the first clock controller 130. If the decoded instruction is a power-up signal, the clock selection unit 140 outputs a selection signal E for selecting the first clock signal CLOCK1 in response to a control signal A outputted from the instruction decoder 150 and a first clock power-up end signal D inputted from the first clock controller 130.

The multiplexer 160 outputs one of the clock signals CLOCK1 and CLOCK 2 generated from the first and second clock generators 110 and 120 as the processor clock signal P_CLOCK, in response to the selection signal 3 or E inputted from the clock selection unit 140.

The first clock controller 130 generates switching on/off signal ON/OFF for controlling the first clock generator 110, in response to a control signal that is outputted from the instruction decoder 150. Specifically, if an instruction decoded in the instruction decoder 150 is power-down instruction, the first clock controller 130 generates a switching OFF signal 5 for switching off the switch 115 in the first clock generator 110, in response to a control signal 2 inputted from the instruction decoder 150 and a clock selection end signal 4 inputted from the clock selection unit 140. If the decoded instruction is a power-up instruction, the first clock controller 130 outputs a switching ON signal C for switching on the switch 114, in response to a control signal B inputted from the instruction decoder 150. The first clock controller 130 outputs the switching on signal ON, and then starts a count operation. If a count value reaches a value of a crystal oscillator wake-up time taken when the crystal oscillator 112 generates a stable first clock signal CLOCK1, the first clock controller 130 outputs a first clock wake-up end signal D to the first clock selection unit 140.

Figure 3A:
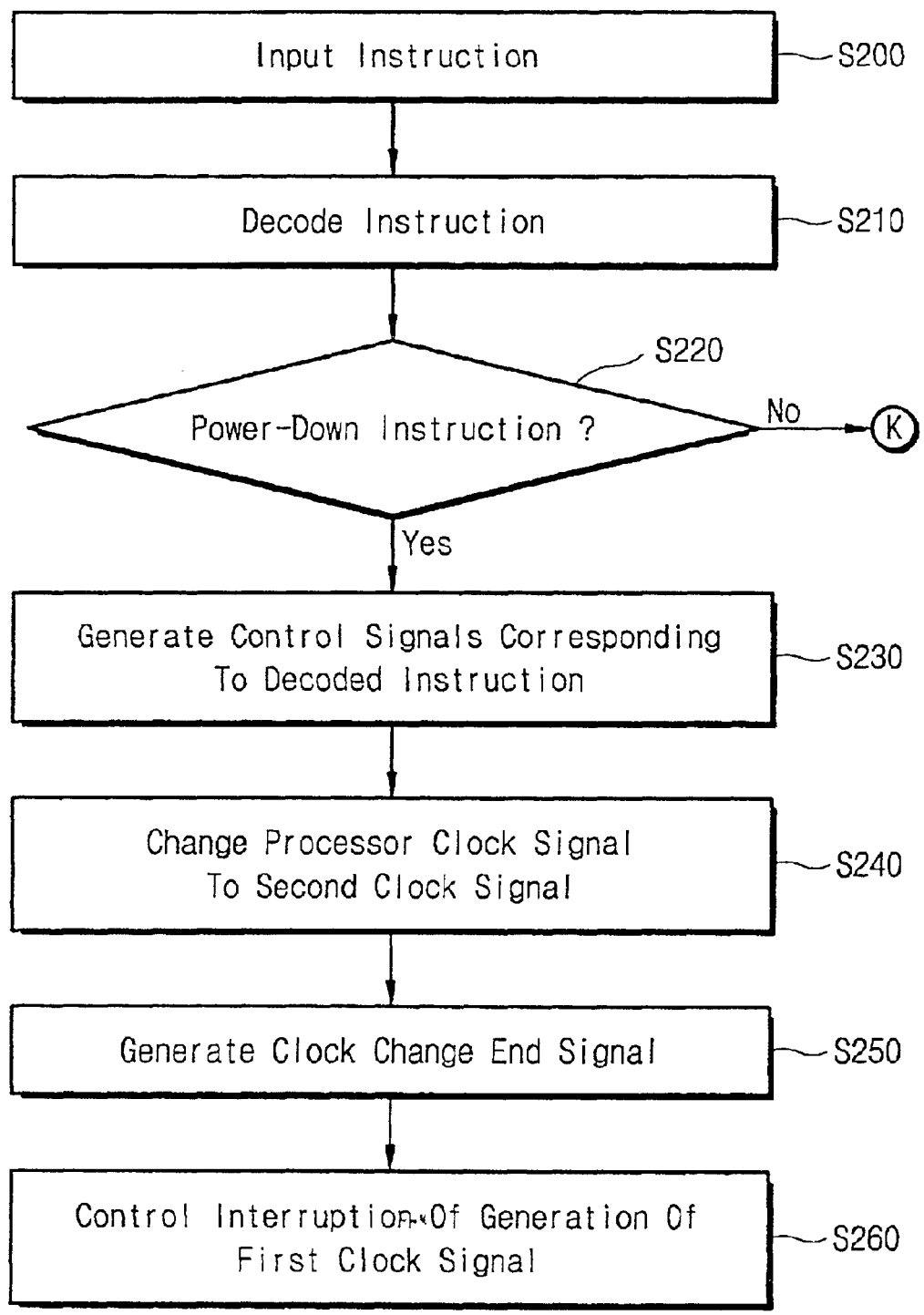
FIG. 3A through FIG. 3B are flowcharts showing the step of inputting a power-down instruction and a power-up instruction to a clock generation circuit, respectively.
Figure 3B:
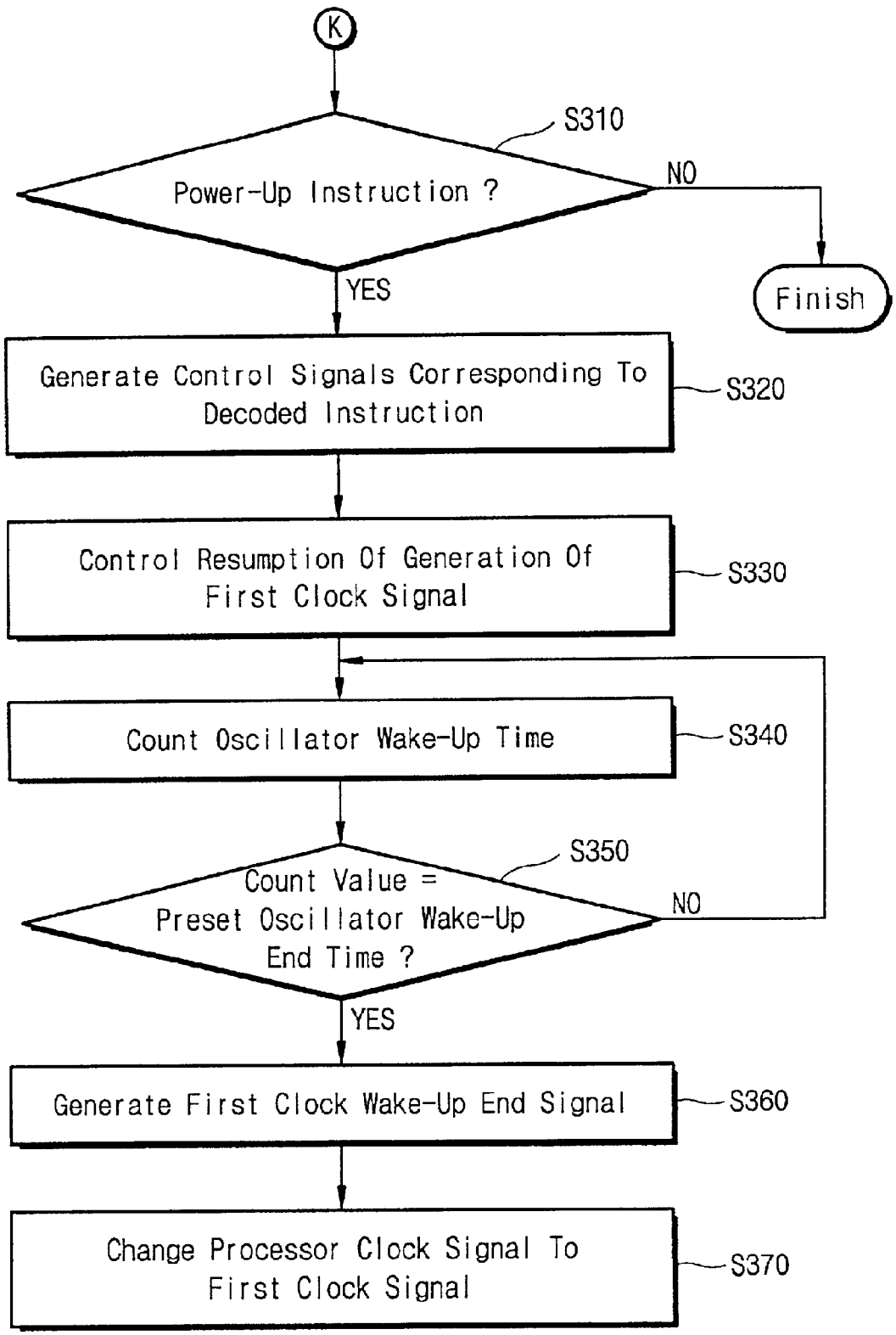

FIG. 3A through FIG. 3B show flows of inputting power-down/up instructions to a clock generation circuit, respectively. FIG. 4 is a timing view showing first and second clock signals, and a processor clock signal that are generated in a clock generation circuit shown in FIG. 2.

In case that a power-up instruction is inputted, operation steps of a clock generation circuit will now be described with reference to FIG. 2 and FIG. 3A.

If an instruction is inputted from an exterior to an instruction decoder 150 (step S200), the instruction decoder 150 decodes the inputted instruction (step S210). In step S220, the instruction decoder 150 checks whether the decoded instruction is a power-down instruction. If so, step S220 proceeds to step S230 wherein the instruction decoder 150 generates controls signals corresponding to the decoded power-down instruction. In step S240, the clock selection unit 140 outputs a selection signal 3 for changing the processor clock signal P_CLOCK from the first clock signal CLOCK1 to the second clock signal CLOCK2. The multiplexer 160 outputs the second clock signal CLOCK2 to the processor clock signal P_CLOCK in response to a selection signal 3 from the clock selection unit 140. In step S250, the clock selection unit 140 outputs a clock change end signal 4. In step S260, the first clock controller 130 outputs the OFF signal for switching off the switch 115 in the first clock generator 110 in response to the clock change end signal 4 from the clock selection unit 140. Therefore, the first clock generator 110 interrupts generation of the first clock signal CLOCK1.

According to the above manner, when an operation mode of a processor is changed from an idle mode to a sleep mode, the processor clock signal P_CLOCK is changed to the second clock signal CLOCK2 that is lower, in frequency, than the first clock signal CLOCK1 being a main signal, as shown in FIG. 4. For example, if a current consumed in the processor is 4 mA and the frequency of the process clock signal P_CLOCK is 30 MHz (the first clock signal), a consumed current may typically be 10 $\mu$A or less where the frequency of the processor clock signal P_CLOCK is perhaps 32 KHz (the second clock signal). Therefore, power consumed in the processor is dramatically reduced during the sleep mode. When the operation mode of the processor is changed from the idle mode to the sleep mode, on changing the processor clock signal P_CLOCK from the first clock signal CLOCK1 to the second clock signal CLOCK2, generation of the first clock signal CLOCK1 is thereby interrupted to further reduce the power consumption.

If the decoded instruction is not the power-down instruction, step S220 proceeds to step S310 shown in FIG. 3B. In step S310, the instruction decoder 150 checks whether the decoded instruction is the power-up instruction. If so, step S310 proceeds to step S320 wherein the instruction decoder 150 generates control signals A and B corresponding to the decoded power-up instruction. In step S330, the first clock controller 130 outputs an ON signal for switching on the switch 115 in the first clock signal generator 110. Therefore, the first clock generator 110 resumes the generation of the first clock signal CLOCK1. In step S340, the first clock controller 130 counts a wake-up time of the first clock generator 110, and checks whether a current count value reaches a preset wake-up end time. If the current count value does not reach the present wake-up end time, step S340 returns to step S240 wherein a count operation is resumed. If the current count value reaches the present wake-up end time, step S340 proceeds to step S360 wherein the first clock controller 130 outputs a first clock wake-up end signal D. In step S370, the clock selection unit 140 outputs a selection signal E for changing the processor clock signal P_CLOCK from the second clock signal CLOCK2 to the first clock signal CLOCK1 in response to the first clock wake-up end signal D from the first clock controller 130. The multiplexer 160 outputs the first clock signal CLOCK1 as the processor clock signal P_CLOCK in response to the selection signal E from the clock selection unit 140.

As the above manner, when an operation mode of a processor is changed from a sleep mode to an idle mode, a processor clock signal is changed from a second clock signal CLOCK2 to a first clock signal CLOCK1 as the main clock signal. A time required for changing the processor clock signal (i.e., a power-up required time) is only to be a first clock wake-up time required for allowing a first clock generator 110 to output a stable first clock signal CLOCK 1.

As explained so far, when an operation mode of a processor built in a CDMA modem chip is a sleep mode, consumed power can be minimized. When the operation mode is changed from an idle mode to the sleep mode, a processor clock signal is changed to a clock signal with a low frequency using a power-down instruction. Then, generation of a clock signal with a high frequency is interrupted to further reduce the power consumption. When the operation mode is changed from the sleep mode to the idle mode, the process clock signal can be changed to a main clock signal using a power-up instruction. In this case, a required time is only the time required for allowing a first clock generator to output a stable main clock signal. Thus, it is possible to prevent deterioration in performance of the processor.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A processor clock generation circuit for a low power consumption modem chip design, comprising:

a first clock generator for generating a first clock signal in response to enable and disable signals;

a second clock generator for generating a second clock signal that is lower in frequency than the first clock signal;

a decoder for decoding an externally inputted instruction to check whether the inputted instruction is a power-down instruction or a power-up instruction, and generating control signals;

a clock selection unit for, if the instruction is the power-down instruction, outputting the second clock signal as a processor clock signal and outputting a clock change end signal in response to a control signal outputted from the decoder and, if the instruction is the power-up instruction, outputting the first clock signal as the processor clock signal in response to the outputted control signal from the decoder and a first clock wake-up end signal; and a first clock controller for, if the instruction is the power-down instruction, outputting the disable signal for disabling clock generation of the first clock generator in response to the control signal outputted from the decoder and the clock change end signal outputted from the clock selection unit and, if the instruction is the power-up instruction, outputting the enable signal for enabling the clock generation of the first clock generator in response to the control signal outputted from the decoder, and outputting the first wake-up end signal after a predetermined time.

2. The processor clock generation circuit of claim 1, wherein the first clock generator includes:

an oscillator for generating the first clock signal; and a switch for enabling/disabling an operation of the oscillator in response to the enable and disable signals.

3. The processor clock generation circuit of claim 2, wherein if the instruction is the power-up instruction, the first clock controller outputs the enable signal for enabling clock the clock generation of the first clock generator, and outputs the first clock wake-up end signal after the lapse of an oscillator wake-up time taken until the oscillator outputs the stable first clock signal.

4. The processor clock generation circuit of claim 1, wherein the clock selection unit includes:

a clock selection signal generator for selecting the second clock signal if the instruction is the power-down instruction and selecting the first clock signal if the instruction is the power-up signal, in response to the control signal outputted from the decoder; and a multiplexer for outputting one of the first and second clock signals as the processor clock signal in response to the selection signal.

5. The processor clock generation circuit of claim 1, wherein the decoder, the clock selection unit, and the first clock generator are constructed in one-chip of the processor.

6. The processor clock generation circuit of claim 1, wherein the modem chip is a code division multiple access (CDMA) modem chip.

7. A method of generating a clock signal for a processor built in a modem chip having a first clock generator for generating a first clock signal and a second clock generator for generating a second clock signal that is lower, in frequency, than the first clock signal, the method comprising:

decoding an externally inputted instruction to check whether the instruction is a power-down instruction and a power-up instruction;

if the instruction is the power-down instruction, then performing a power down method comprising:

selecting a clock signal supplied to the processor as the second clock signal;

generating a clock change end signal; and controlling the first clock generator to interrupt generation of the first clock signal, if the instruction is the power-up instruction, then performing a power-up method comprising:

controlling the first clock generator to interrupt generation of the first clock signal;

counting a wake-up time of the first clock generator;

checking whether the a wake-up count value reaches a preset wake-up end time value;

if the wake-up count value does not reach the preset wake-up end time value, then repeating the counting step; and if the wake-up count value reaches the preset wake-up end time value, selecting the supplied clock signal as the first clock signal.

8. The method of claim 7, wherein the wake-up end time is a time required for allowing the first clock generator to output a stable first clock signal.

* * * * *